United States Patent Office 3,767,629
Patented Oct. 23, 1973

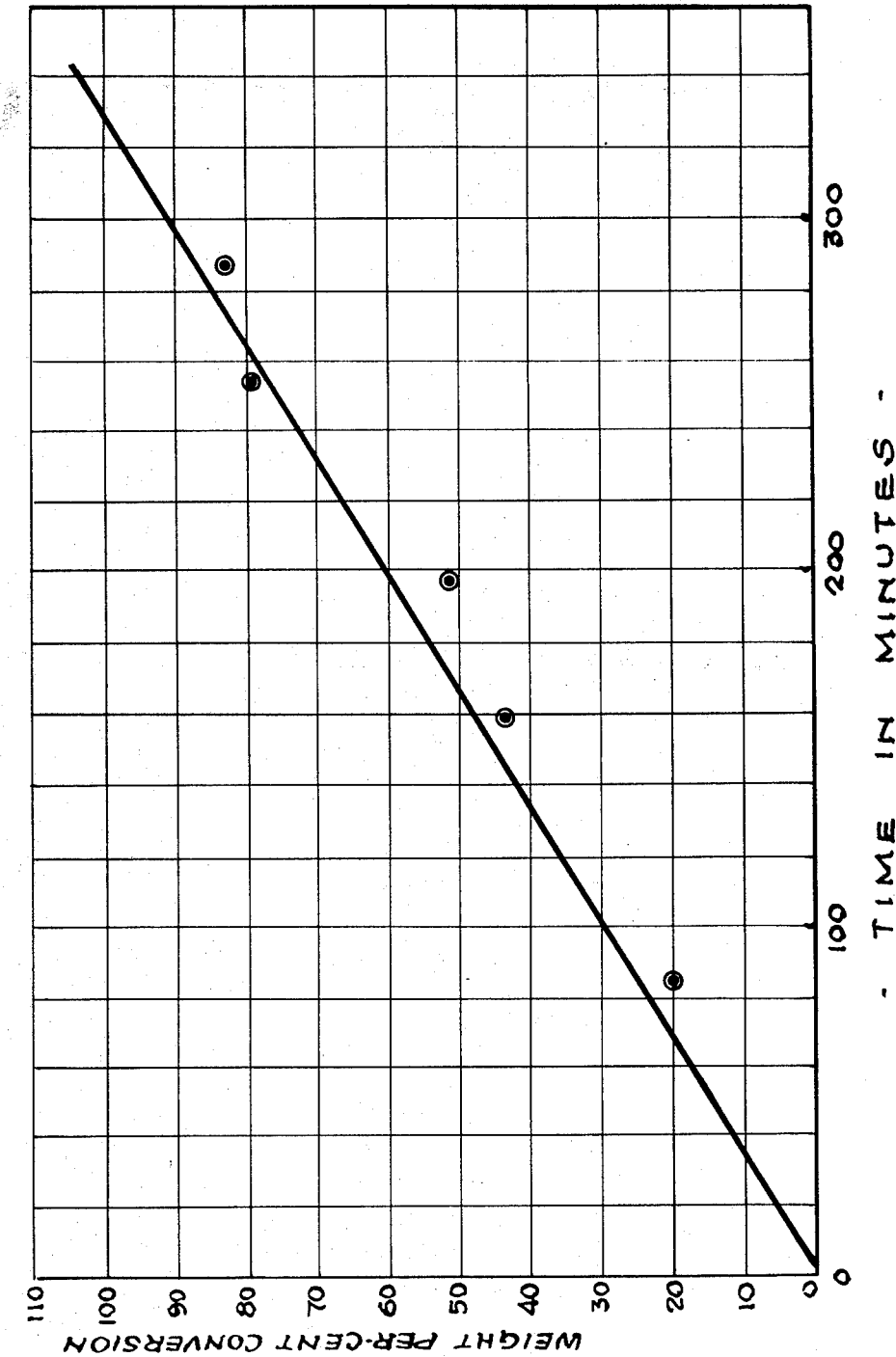

3,767,629
USE OF AIR TO CONTROL POLYMERIZATION OF WATER-SOLUBLE MONOMERS
Barney Vallino, Jr., Homewood, and Donald R. Anderson, Oswego, Ill., assignors to Nalco Chemical Company, Chicago, Ill.
Continuation-in-part of abandoned application Ser. No. 172,796, Aug. 18, 1971. This application Oct. 12, 1971, Ser. No. 188,497
Int. Cl. C08f 15/02, 1/13, 3/90
U.S. Cl. 260—80.3 N        9 Claims

ABSTRACT OF THE DISCLOSURE

Air modulation may be used for the control of certain water-soluble vinyl addition polymerization processes in production size equipment.

This application is a continuation-in-part of our co-pending application Ser. No. 172,796, filed Aug. 18, 1971, now abandoned.

INTRODUCTION

This invention concerns the direct introduction of air into a water-soluble vinyl addition polymerization process in order to control the rate of reaction.

There are several methods that may be used for producing concentrated water-soluble vinyl addition polymer reaction masses. Certain of these include an emulsion method, the inverse emulsion method, the suspension method, and the inverse suspension method. All of these methods have a disadvantage, namely, that there is no simple way of safely handling the heat evolved from a large reactor when concentrated monomer charges are polymerized by these methods. As a result of this problem, the typical monomer loading in a large scale plant reactor is of the order of 15%. Monomer loading in this range is difficult to control and any loading in excess of this level is restricted since the reaction is completely uncontrollable. The fact that the introduction of air controls the reaction rate is very significant. It means that a reaction can be controlled within reasonable temperature limits independently of the heat transfer system available. It also means that higher molecular weight polymers which appear to be favored by high monomer levels can be reacted safely. Further, the reaction can be conducted as speedily as possible within the limits of temperature change and heat transfer surfaces.

OBJECTS

An object of this invention is to provide a method to control the reaction rate in certain vinyl polymerization processes.

Another object of this invention is to provide such control of the reaction as to allow monomer loading in excess of 15%.

A further object of this invention is to modulate the reaction rate in such a way as to prevent excessive heat accumulation in a plant size reactor.

Further objects will be disclosed herein.

THE INVENTION

This invention relates to the introduction of air into a water-soluble vinyl addition polymerization process in order to control the rate of reaction and to facilitate increased monomer loading. Typical polymerization methods are described in U.S. Pats. 3,284,393 and 3,282,874.

U.S. Pat. 3,284,393 is a water-in-oil emulsion system. This system involved the formation of an emulsion by the addition of a monomer phase to an oil phase containing an emulsifying agent. The monomer phase is comprised of a water-soluble ethylenic unsaturated monomer in an aqueous solution. The oil phase is any inert hydrophobic liquid such as hydrocarbons and substituted hydrocarbons. Any emulsifying agent which is oil soluble is acceptable.

In accordance with the teachings of U.S. 3,284,393, all known polymerizable water-soluble ethylenic unsaturated monomers, the polymers of which are insoluble in the continuous oil phase, can be polymerized by a water-in-oil emulsion polymerization process to give a polymeric latex. Such monomers have a water solubility of at least 5 weight percent and include acrylamide, methacrylamide, acrylic acid, methacrylic acid, vinylbenzyl dimethylammonium chloride, alkali metal and ammonium salts of 2-sulfoethylacrylate, arsodium styrene sulfonate, 2-aminoethylmethacrylate hydrochloride, alkali metal and ammonium salts of vinylbenzyl sulfonates and the like. When aqueous solutions of the monomers are used, they can be varied widely in monomer content. Proportions between 100 and 5 percent by weight monomer corresponding to 0 to 95 percent water are used, depending upon the monomer and the temperature of polymerization. The ratio of monomer phase to oil phase is also widely variable, advantageously between 30 and 70 parts of the former to between 70 and 30 parts of the latter by weight. A monomer phase to oil phase ratio of about 70 to 30 is preferred.

In order to emulsify the monomer phase into the oil phase to give a water-in-oil emulsion, an emulsifying agent of the water-in-oil type is used in amount ranging between 0.1 and 10 percent by weight of the oil phase. Any conventional water-in-oil emulsifying agent can be used, such as hexadecyl sodium phthalate, sorbitan monooleate, sorbitan monostearate, cetyl or stearyl sodium phthalate, metal soaps, and the like.

The oil phase can be any inert hydrophobic liquid which can readily be separated from the disperse phase polymeric product.

A preferred group of organic liquids are the hydrocarbon liquids which include both aromatic and aliphatic compounds. Thus, such organic hydrocarbon liquids as benzene, xylene, toluene, mineral oils, kerosenes, naphthas and, in certain instances, petrolatums may be used. A particularly useful oil from the standpoint of its physical and chemical properties is the branch-chain isoparaffinic solvent sold by Humble Oil and Refining Company under the trade name "ISOPAR M." Typical specifications of this narrow-cut isoparaffinic solvent are set forth below in Table I:

TABLE I

| Specification properties | Minimum | Maximum | Test method |
|---|---|---|---|
| Gravity, API at 60/60° F | 48.0 | 51.0 | ASTM D 287. |
| Color, Saybolt | 30 | | ASTM D 156. |
| Aniline point, ° F | 185 | | ASTM D 611. |
| Sulfur, p.p.m. | | 10 | ASTM D 1266 (Nephelometric mod.). |
| Distillation, ° F | | | ASTM D 86. |
|   IBP | 400 | 410 | |
|   Dry point | | 495 | |
| Flash point, ° F. (Pensky-Martens closed cup). | 160 | | A TM D 93. |

Free radical yielding initiators useful in polymerizing ethylenic unsaturated monomers, such as benzoyl peroxide, lauroyl peroxide, 2,2'-azobis (isobutyronitrile), potassium persulfate and the like are used in the polymerization, advantageously in amounts ranging between 0.002 and 0.2 percent by weight of the oil or monomer phase, depending upon the solubility of the initiator. Polymerization can also be carried out using high energy electrons from a Van de Graaff accelerator, etc., or ultraviolet irradiation.

Elevated reaction temperatures, advantageously between 40° and 70° C., are used with free radical yielding initiators. Within such a temperature range, conversion is substantially complete in from one-half hour to several days, depending upon monomer and reaction variables. High energy or ultraviolet irradiation polymerization is carried out at room temperature or above or below room temperature, as desired.

U.S. Pat. 3,282,874 is a water-in-oil inverse suspension system. This shows that aqueous solutions of water-soluble unsaturated monomers, and mixtures thereof, can be suspended in an oil phase to form a suspension of globules ranging between 10 microns and 2 mm. in diameter and polymerized therein to give polymeric products in bead form having a controlled size.

A water-in-oil suspending agent is dissolved or suspended in an oil phase. An aqueous solution of monomer or mixed monomers is added to the oil phase with vigorous agitation until the aqueous solution is suspended in the oil phase as globules ranging between 10 microns and 2 mm. in diameter.

The reaction temperature is then raised to between 20° and 100° C. with continued mild agitation to prevent separation of phases or adhesion of polymer beads. Polymerization is initiated by an added free radical generator or by ultraviolet or X-radiation. The reaction is continued, generally with mild agitation, until conversion is substantially complete. Polymeric beads are thereby formed, which are separated from the reaction medium, washed and dried.

The suspending agent is a solid or liquid substance having a low hydrophile-lyophile balance, i.e., is preponderantly hydrophobic. Inorganic hdyroxy-oxides having substituent hdyrocarbonylsilyl, hydrocarbonylsilylene or hydrocarbonylsilylidyne radicals are particularly useful suspending agents. Other useful solid suspending agents include low hydrophile-lyophile kaolin treated with rosin amine, bentinite treated with organic ammonium cation yielding reagents, etc. The disclosures of U.S. 3,284,393 and U.S. 3,282,874 are incorporated herein by reference.

All known water-soluble unsaturated monomers can be polymerized by the inverse suspension polymerization process of this invention. Such monomers include acrylamide, methacrylamide, acrylic acid, methacrylic acid, vinylbenzyl trimethylammonium chloride, alkali metal and ammonium salts of 2-sulfoethylacrylate, 2-aminoethyl methacrylate hydrochloride, alkali metal and ammonium salts of vinylbenzyl sulfonate, etc. Aqueous solutions of the monomers to be polymerized can be varied widely in monomer content, i.e., from about 5 to 80 weight percent of monomer in water, depending upon the monomer and the polymerization temperature. The ratio of aqueous monomer phase to oil phase is also widely variable, advantageously from about 5 to 75 weight parts of aqueous phase to 95 to 25 parts of oil phase.

The oil phase can be any inert hydrophobic liquid which can be separated readily from the polymeric product. Of such liquids the hydrocarbons and chlorinated hydrocarbons such as toluene, xylene, o-dichlorobenzene, monochlorobenzene, propylene dichloride, carbon tetrachloride, etc. are advantageously used. Toluene and xylene are preferred as oil phase liquids.

The reaction time is widely variable depending upon the catalyst system, and ranges generally between about 10 minutes and two hours at temperatures between about 20° and 100° C.

The disadvantages of these processes occur in plant size reactions. The amount of heat that is released is not readily dissipated by normal cooling facilities when the monomer concentration exceeds 15%. A plant sized reactor may be defined for purposes of this disclosure as one which is at least 100 gallons; preferably, one which is at least 1,000 gallons. Generally, the reactor vessels may be as large as 8,000 to 12,000 gallons. If the reaction is performed at monomer loadings in excess of 15%, the reaction rate cannot be controlled. Essentially, the reaction rate gets out of control and the temperature increases rapidly.

It has been found that the introduction of trace quantities of air to the reaction stops the reaction progress instantly. The fact that air retards or stops a poymerization reaction has been long known to the art. The invention herein claimed involves the application of this known fact as a reaction controlling procedure, in that it is utilized in conjunction with nitrogen as a device to control the overall rate of polymerization and therefore the rate of heat generation. Consequently, when maximum reactor cooling is incapable of maintaining the desired reaction temperature, appropriate introduction of air can slow the rate of conversion to balance heat generation with heat removal at the desired reaction temperature. This procedure can be followed repeatedly until all of the monomer has been reacted and still produce a high molecular weight polymer without in any way affecting the properties of the finished product.

It must be recognized that the greatest utility of this procedure is when the heat extraction capability is insufficient to control the bulk reaction temperature of a plant scale reactor having a high monomer concentration. Without this throttling procedure the temperature would be uncontrollable in such a reaction.

In general, the amount of air needed to modulate the polymerization reaction ranges between $1/2000$ and $1/10$ standard cubic foot per cubic foot of the reactor volume. The preferred range is between $1/1000$ and $1/4$ standard cubic foot of reactor. Most preferably the range is from $1/100$ to $1/4$ standard clubic foot of reactor.

In order to re-initiate the reaction the amount of inert gas, preferably nitrogen, needed to strip out the oxygen ranges between 0.03 and 10.0 standard cubic foot per cubic foot of the reactor. The preferred range is between 1.0 and 5.0 standard cubic foot per cubic foot of reactor.

A preferred embodiment of the invention consists in continuous feeding to the reactor the inert gas throughout the entire time that the polymerization is taking place. Air may be intermittently injected to control the reaction temperature even though the inert gas is continually entering the reaction vessel.

While the inert gas has been described primarily with respect to the use of nitrogen, it will be understood other inert gases such as helium, Argon or other gas that does not react under the polymerization conditions used may be employed.

Also, while the term "air" has been used to describe atmospheric air it will be understood that oxygen may be substituted therefor for purposes of this disclosure and is considered to be within the term "air."

A particular embodiment of this invention can be shown in the following examples.

EXAMPLE I

| Recipe: | Pounds |
|---|---|
| Isopar M | 72.3 |
| Sorbitan monostearate | 3.8 |
| Water | 101.5 |
| Acrylamide | 53.4 |
| Acrylic acid | 22.8 |
| Sodium hydroxide (50%) | 25.3 |
| Toluene | 1.71 |
| 2,2'-azobis (isobutyronitrile) 34.7 grams. | |

The Isopar M and sorbitan monostearate were charged to a 100-gallon reactor and mixed until the emulsifier was completely dissolved. The ingredients in the reactor were brought to 115° F. under an atmosphere of high purity nitrogen. In a separate monomer makeup tank the acrylamide, acrylic acid, and water were blended. The sodium hydroxide was added to give a pH of approximately 8.5. The monomer phase was added to the oil phase. The temperature was allowed to return to 115° F. and the reactor system was purged with high purity nitrogen for 30 minutes. The catalyst was then added to initiate the reaction. The temperature was allowed to climb to from 115°–118° F. due to the heat of reaction. At this time the nitrogen purge was discontinued and a very small amount of air was introduced into the reactor below the liquid level. At the same time cooling water was introduced into the jacket of the reactor. This stopped the reaction immediately as indicated by the immediate and gradual decrease in the bulk reaction temperature. When the reaction temperature dropped to 115° F. the air purge was discontinued and the nitrogen purge was introduced to purge oxygen from the system. As indicated by the increase in the reaction temperature, the reaction began to initiate again.

This throttling of nitrogen and the air eliminated the necessity of heating the mass. The temperature was held constant between 115°–118° F. The volume of air needed to stop the reaction at each interval was approximately 1/6 standard cubic foot of air per cubic foot of reactor. The amount of nitrogen needed to reinitiate the reaction after each stop was approximately 1/2 standard cubic foot per cubic foot of the reactor.

After the seventh air stop, the reaction was complete and the reaction temperature was allowed to climb to 130° F. and the batch allowed to react there until the reaction was completed as indicated by a dropoff in bulk temperature. The conversion data is shown in the drawing verifying that the reaction has gone to 100% of completion. The product from this run had an intrinsic viscosity of 25, normally 15, and the settling test result of 1.1, normally 1.0. Thus, the product was a high performance polymer of higher activity than available from other processes.

EXAMPLE II

Recipe: Pounds
  Isopar M _____ 655
  Sorbitan monostearate _____ 44
  Water _____ 967
  Acrylamide _____ 645
  Acrylic acid _____ 275
  Sodium hydroxide (50%) _____ 306
  Toluene _____ 98
  2,2'-azobis (isobutyronitrile) 2190 grams.

The reactants were mixed and blended identically as described in Example I, with the exception that the solids level was 35%. This reaction was performed by using 13 air stops. The final product had an intrinsic viscosity of 23.0 and the settling test result of 1.1. Again, the product formed was a high performance polymer having an increased activity over available processes.

EXAMPLE III

Recipe: Pounds
  Isopar M _____ 580
  Sorbitan monostearate _____ 50
  Water _____ 815
  Arcylamide _____ 705
  Acrylic acid _____ 301
  Sodium hydroxide (50%) _____ 334
  Toluene _____ 112
  2,2'-azobis (isobutyronitrile) 2490 grams.

This reaction was performed in the same manner as in Example I, with the exception being that the solids level is approximately 40%. Again, the product was of high quality having intrinsic viscosity of 22.0 and the settling test result of 1.1.

EXAMPLE IV

Recipe: Pounds
  Isopar M _____ 13,664
  Sorbitan monostearate _____ 798
  Water _____ 17,287
  Acrylamide _____ 15,400
  Methacrylic acid _____ 1,147
  Sodium hydroxide (50%) _____ 1,147
  Toluene _____ 432
  2,2'-azobis (isobutyronitrile) 17.7 grams.

This reaction was performed in the same manner as in Example I, with the exceptions that $N_2$ gas was continuously fed to the reactor and total cooling water capacity was used. The injection of air was used to modulate and control the reaction. Ten modulations of air were necessary at which time the reaction was complete. The intrinsic viscosity was 13.8.

The settling test values referred to in the examples were determined by the following procedure:

The test is performed in 100 ml. graduated tubes which are 28 cm. in length and 25 mm. I.D., having a beaded rim to accept a rubber stopper. To a graduated tube is added 11.5 grams of —200 mesh quartz silica. Distilled water is added to fill the tube to the 90 ml. mark; then 10 ml. of 0.01 N sulfuric acid is added to the tube. The tube is then stoppered, rotated several times, and allowed to stand overnight.

A 1.0% solution of polymer is prepared in distilled water by dissolving 1.5 grams polymer in 148.5 grams distilled water in an 8 oz. jar by agitating for 1 hour at 1300 r.p.m. The polymer solution is allowed to stand for 3 hours, after which time a 0.01% solution is prepared from the 1.0% solution.

A 0.5 ml. sample of the 0.01% polymer is added to the mixture in the tube. The tube is stoppered and placed in a mechanical rotator which rotates the tube at 30 r.p.m. After 20 rotations the tube is removed and the time is measured for the interface of solids to fall from the 90 ml. mark to the 40 ml. mark which is a distance of 10 cm.

This procedure is performed for a standard material and for any sample to be tested.

The activity of the polymer is calculated as follows:

$$\text{Activity} = \frac{\text{Average settling time at 0.5 p.p.m. of standard}}{\text{Average settling time at 0.5 p.p.m. of sample}}$$

The standard material should be run daily and the number of seconds to settle the 10 cm. distance represents an activity of one. Thus, if the standard settles in 60 seconds and the sample settles in 30 seconds; the activity is 2.0.

This invention is hereby claimed as follows:

1. A polymerization method for a preferred reactor vessel size of at least 1,000 gallons which comprises the reacting of the following composition in an atmosphere of innert gas:
  (A) at least 15% by weight of at least one water-soluble vinyl addition monomer;
  (B) water;
  (C) a water-in-oil emulsifying agent or a suspending agent;
  (D) a hydrophobic liquid; and
  (E) a free radical initiator
wherein the reaction rate of the process is controlled by the direct introduction of air and inert gas into the reaction system in the following amounts:
  (A) air in the range between 1/2000 and 1/10 standard cubic foot per cubic foot of reactor; and
  (B) inert gas in the range of 0.3 and 10.0 standard cubic foot per minute per cubic foot of the reactor.

2. The method of claim 1 wherein the reaction rate of the process is instantly stopped by the direct introduction of air into the reaction system.

3. The method of claim 1 wherein the water-soluble vinyl addition monomer is acrylamide.

4. The method of claim 1 wherein the water-soluble vinyl addition monomer consists of acrylamide and acrylic acid.

5. The method of claim 1 wherein the water-soluble vinyl addition monomer consists of acrylamide and methacrylic acid.

6. The method of claim 1 wherein the inert gas is nitrogen.

7. The method of claim 1 wherein the inert gas is continuously fed to the reactor vessel.

9. A polymerization method for a preferred reactor vessel size of at least 1,000 gallons which comprises the reacting of the following composition in an atmosphere of inert gas:
- (A) at least 15% by weight of at least one water-soluble vinyl addition monomer;
- (B) water;
- (C) a water-in-oil emulsifying agent or a suspending agent;
- (D) a hydrophobic liquid; and
- (E) a free radical initiator wherein the reaction rate of the process is controlled by the direct introduction of air and inert gas into the reaction system in the following amounts:
- (A) air in the preferred range between $\frac{1}{100}$ and $\frac{1}{4}$ standard cubic foot per cubic foot of the reactor; and
- (B) inert gas in the preferred range between 1.0 and 5.0 standard cubic foot per minute per cubic foot of the reactor.

References Cited
UNITED STATES PATENTS

| | | | |
|---|---|---|---|
| 2,932,628 | 4/1960 | Uraneck | 260—84.1 |
| 2,982,749 | 5/1961 | Friedrich | 260—23 |
| 3,284,393 | 11/1966 | Vanderhoff | 260—29.6 |

JOSEPH L. SCHOFER, Primary Examiner

C. A. HENDERSON, Jr., Assistant Examiner

U.S. Cl X.R.

260—79.3 MU, 80, 89.7 R, 89.7 N

UNITED STATES PATENT OFFICE
CERTIFICATE OF CORRECTION

Patent No. 3,767,629        Dated October 23, 1973

Inventor(s) BARNEY VALLINO, JR. and DONALD R. ANDERSON

It is certified that error appears in the above-identified patent and that said Letters Patent are hereby corrected as shown below:

TABLE I, last line, last column for "A TM D 93" should read --ASTM D 93-- .

Signed and sealed this 2nd day of April 1974.

(SEAL)
Attest:

EDWARD M.FLETCHER,JR.
Attesting Officer

C. MARSHALL DANN
Commissioner of Patents